June 11, 1935.  R. B. LOIBL, JR  2,004,122

PEST EXTERMINATOR

Filed Oct. 23, 1933

INVENTOR.
ROBERT B. LOIBL JR.
BY
ATTORNEY

Patented June 11, 1935

2,004,122

UNITED STATES PATENT OFFICE 2,004,122

PEST EXTERMINATOR

Robert B. Loibl, Jr., Los Angeles, Calif.

Application October 23, 1933, Serial No. 694,785

3 Claims. (Cl. 299—20)

This invention relates to devices for destroying pernicious insects.

An important object of the invention is to provide an effective means for dispensing a liquid insecticide for the abatement of ants and other insects.

A further object of the invention is to so construct the novel trap that it will be composed of the least number of parts, thus contributing to low cost without impairing efficiency.

A still further object of the invention is to make it fool-proof whereby pets, fowls and the like will be protected from being accidentally poisoned.

Yet another important object resides in the novel assembly of parts wherein a more effective filling and sealing means is provided for the dispensing opening when the parts are all assembled after the container is filled and ready for use.

With the above and still other objects in view the brief description of the drawing, upon which the disclosure is based, will now be given.

Figure 1:
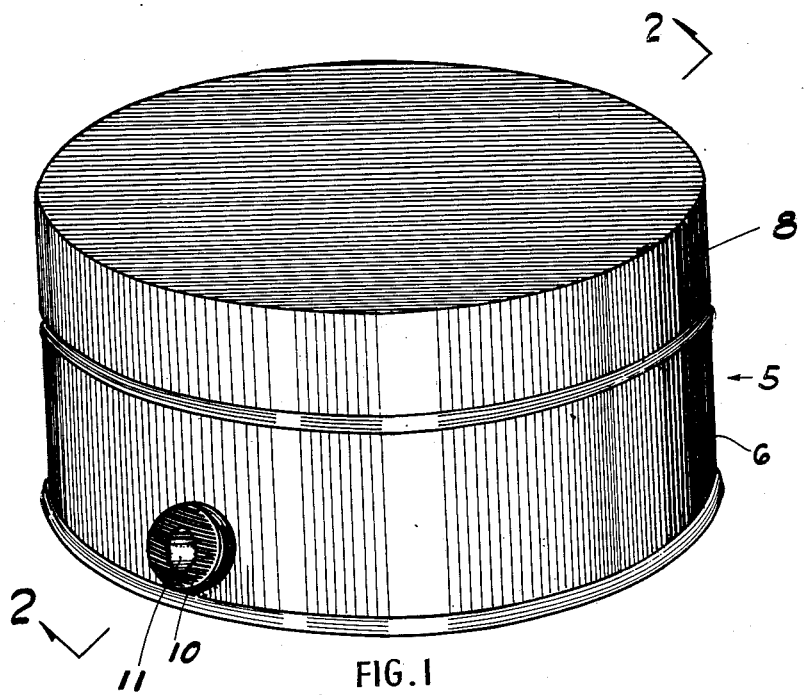
Fig. 1 is a perspective view of the device without the wick.
Figure 2:
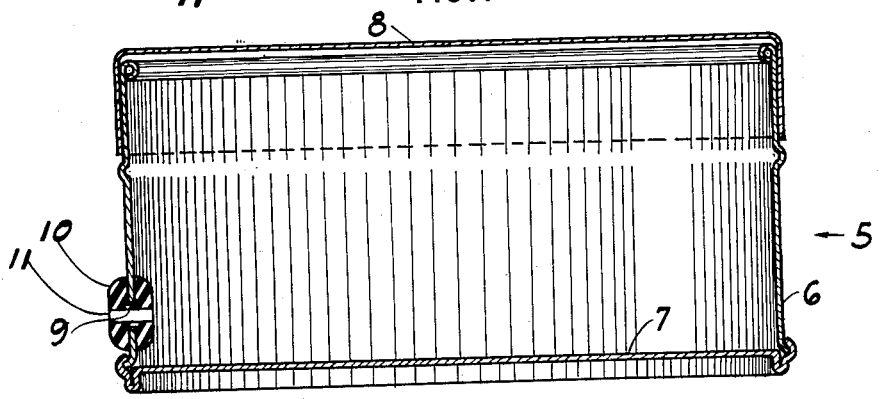
Fig. 2 is a section taken on line 2—2 of Fig. 1.

Referring in detail to the drawing, the invention includes a container 5, which may be a drum-shaped can having a side wall 6, and which is provided with a bottom 7 and any conventional cover member 8. This cover may or may not be manually removable. If it is made non-removable children and pet animals will be safeguarded against partaking of the poison.

The container 5 is provided through its side wall 5, with a circular feed opening 9 through which an insecticidal liquid contained within the can is gradually fed by means presently to be described.

An elastic squeeze plug 10 having a diametrical ooze aperture 11 is fitted within the wall aperture 9. Said plug, by preference and as shown, is of a spheroidal or somewhat globular shape. It has a circular groove 12 extending around its girth along a line which marks the greatest circumference of the plug.

Figures 3, 4:
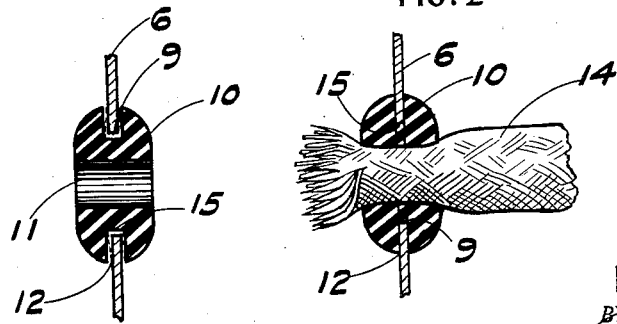
Fig. 3 is an enlarged section taken thru the mid-center of the squeeze plug showing the normal relation of plug and container without the wick being in place.
Fig. 4 is an enlarged section taken thru the mid-center of the squeeze plug with the wick in place, a fragment of the container per se being added to show the close fit of the plug after the wick has been inserted therein.

A wick 14 is provided for inserting through the ooze aperture 11, said wick affording means for a gradual dispensing of the liquid contents of the can. The thickness of this wick is considerably greater than the diameter of the ooze aperture 11, in order that, when said wick is forced into place as shown in Fig. 4, the plug will be distorted in such a manner that the side walls of the groove 12 will be brought forcibly into contact with the portion of the can surrounding its opening 9, thus forming a liquid-tight seal around said opening.

It is desirable to construct the rubber or other elastic plug 10 in such a manner that its grooved portion may readily be inserted by hand within the can opening 9. In order to facilitate such insertion of the plug it is necessary that normally the width of its groove 12 be slightly greater than the thickness of the can wall 6, and it is likewise important that the plug have a neck portion 15 which is of less diameter than the can opening 9. However, when the wick 14 is in place, owing to its thickness, it not only distorts the plug in such a way as to cause the sides of the groove 12 to grip the wall of the can, but said wick also enlarges the neck 15 of the plug sufficiently to cause it to fit tightly within the edge portion of the opening 9. (See Fig. 4.)

Reference has been made to the fact that the cover 8 may be non-removable in order to safeguard children obtaining access to the contents of the can. When this is done, the wick 14 may be withdrawn from the emptied can, either with or without removing the plug 10, whereupon the can may be refilled with poisonous liquid through the plug aperture 11, or the can opening 9, as the case may be.

The cans will outlast the plugs and therefore it is purposed to provide the plug as a separate article of manufacture and one which is adapted to fit a circular hole in any can suitable for the intended purpose.

It is to be understood that the projecting portion of the wick 14 provides that ants and other insects to be destroyed will obtain free access to the poison.

I claim:

1. In a device of the kind described, a container for holding a liquid insecticide having a combined filling and dispensing opening in one of the walls thereof, in combination with a squeeze plug comprising a body having a mid-girth groove, the opposite sides of said groove lying in the same plane and being normally parallel, the walls of said container adjacent said opening being adapted to be engaged within said groove, there being an ooze-hole extending thru said plug surrounded by said groove, and a wick extending axially thru said ooze-hole to dispense the poisonous contents of said container, the thickness of said wick being greater than the normal diameter of said ooze-hole whereby to distort the walls of said groove into substantially liquid tight engagement with the walls of said container.

2. In a device of the kind described, a can having a dispensing opening through its wall, a plug for said opening, said plug having a groove extending therearound, there being an aperture through said plug surrounded by said groove, said plug being sufficiently elastic to provide that it be manually distortable the extent necessary for insertion of its grooved portion into said opening, and a wick insertable through said aperture of the inserted plug, said wick being of sufficient thickness to distort the inserted plug into a fluid-tight fit within the can opening.

3. In a device of the kind described, a can having a dispensing opening through its wall, a plug for said opening, said plug having a groove extending therearound, there being an aperture through said plug surrounded by said groove, the normal diameter of said plug at the bottom of said groove being less than the diameter of said dispensing opening, said plug being sufficiently elastic to provide that it be manually distortable the extent necessary for insertion of its grooved portion into said opening, and a wick insertable through said aperture of the inserted plug, said wick being of sufficient thickness to distort the inserted plug into a fluid-tight fit within the can opening.

ROBERT B. LOIBL, Jr.